Oct. 11, 1966 W. C. MANN 3,278,852

REDUNDANT CLOCK PULSE SOURCE UTILIZING MAJORITY LOGIC

Filed Sept. 6, 1963

WITNESSES

Theodore F. Wrobel

James F. Young

INVENTOR

William C. Mann

BY Dean Schron

ATTORNEY

United States Patent Office 3,278,852
Patented Oct. 11, 1966

3,278,852

REDUNDANT CLOCK PULSE SOURCE UTILIZING MAJORITY LOGIC

William C. Mann, Laurel, Md., assignor to Westinghouse Electric Corporation, East Pittsburgh, Pa., a corporation of Pennsylvania Filed Sept. 6, 1963, Ser. No. 307,051
5 Claims. (Cl. 328—60)

This invention in general relates to high reliability signal providing apparatus, and more in particular to a clock pulse source for redundant logical systems.

Redundant systems are utilized in many types of electrical circuits and are particularly adapted for use in electronic computers. Generally, if a failure of a particular circuit occurs in such an electronic computer, an erroneous output or control results necessitating a replacement of the faulty circuit, which may be a time consuming, and sometimes impossible, operation. To eliminate erroneous readings, and provide a greater mean-time-before-failure, various computers have been built utilizing some sort of redundancy techniques. In order to perform certain operations as well as to compare duplicate bits of information in systems employing redundancy techniques, various signals must have the same value at the same time. In conventional computers, this is accomplished by timing and controlling different operations with a single source of regular pulses commonly called the clock. A conventional clock pulse source utilized in a redundant system would be undesirable since the system so constructed would depend upon a single circuit for its operation, and if that circuit failed the entire system would fail.

It is, therefore, a primary object of the present invention to provide a highly reliable clock pulse source.

It is another object to provide a pulse source which will provide a correct output even though components in the pulse source may fail.

It is a further object of the present invention to provide a highly reliable clock pulse source which can provide multi-phase output signals.

Briefly, in accordance with the above cited objects, there is provided a highly reliable pulse source including a plurality of sets of switching devices each capable of providing output signals. The sets of switching devices are arranged such that a set of switching devices is responsive to output signals from a predetermined number of switching devices from a preceding set to provide respective output signals, with the sets of switching devices arranged in a loop configuration such that a first set of switching devices is made responsive to a last set of switching devices. In the embodiment of the present invention to be described hereinafter, the pulse source includes a plurality of signal channels with each channel including a first switching device succeeded by a decision element which receives the output signals from switching devices in a predetermined number of other channels to thereby provide a resultant signal in accordance with a predetermined number of input signals received. The resultant signal from each decision element is in turn utilized to respectively activate next succeeding switching devices which provide output signals to a next plurality of decision elements. The general scheme is continued until a last plurality of decision elements provides resultant signals to activate the first plurality of switching devices.

The above stated and other objects will become more clearly apparent after a study of the following specification when read in conjunction with the accompanying drawings, in which.

Figure 1:
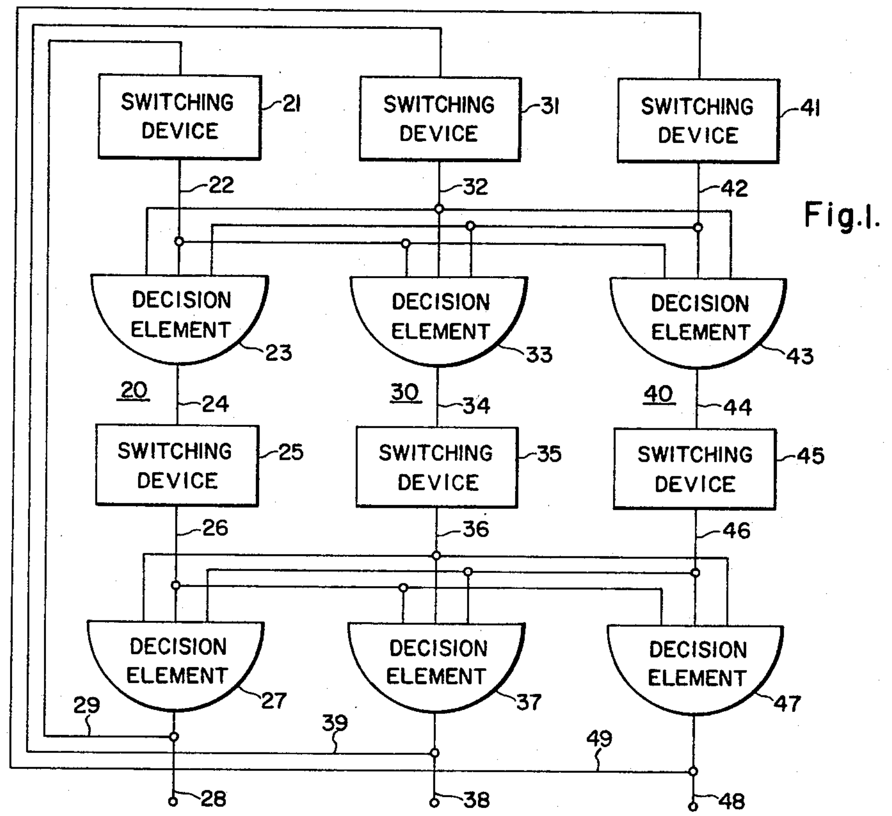
FIGURE 1 is a schematic diagram illustrating one embodiment of the present invention.

Referring now to FIG. 1, there is shown a highly reliable pulse source including a plurality of channels, three of which are shown. Each of the three channels 20, 30 and 40 include a first switching device 21, 31 and 41, respectively, for providing output signals on lines 22, 32 and 42. Arranged in a serial fashion in each of the signal channels 20, 30 and 40 is a next succeeding decision element 23, 33 and 43 with each being responsive to the output signals produced by a predetermined number of preceding switching devices, and in the embodiment shown, decision element 23 receives the output signal from switching devices 21, 31 and 41. In a similar fashion, decision elements 33 and 43 receive the output signals from switching devices 21, 31 and 41 via the lines 22, 32 and 42. Decision elements 23, 33 and 43 are of the type that provide an output resultant signal in accordance with a predetermined number of input signals received. One such type of decision element is the common majority voter which will provide a majority signal, that is, a resultant output signal identical to the majority of input signals received. Other types of decision elements may be utilized, such as one more fully described and claimed in a copending application Ser. No. 315,301, by William C. Mann and Paul A. Jensen, filed Oct. 10, 1963, and assigned to the same assignee of the present invention. The decision element therein includes a plurality of input lines for receiving similar input signals and has means to eliminate a line from the circuit if an incorrect signal appears on that line so that a resultant output signal may be provided when only two correct input signals remain. Other types of decision elements known to those skilled in the art are applicable to the present invention. The decision elements 23, 33 and 43 therefore provide a resultant signal which is utilized to activate a next plurality of switching devices 25, 35 and 45. A next succeeding plurality of decision elements 27, 37 and 47 each receive the output signals provided by the next preceding set of switching devices 25, 35 and 45 along the lines 26, 36 and 46 to thereby provide a resultant signal on lines 28, 38 and 48. The output signals provided by the decision elements 27, 37 and 47 are fed back to the first plurality of switching devices 21, 31 and 41 along the lines 29, 39 and 49 respectively, to activate these latter switching devices. One type of switching device which may be utilized herein is a common multivibrator having on and off states of operation, and to this end reference is now made to FIG. 2.

Figure 2:
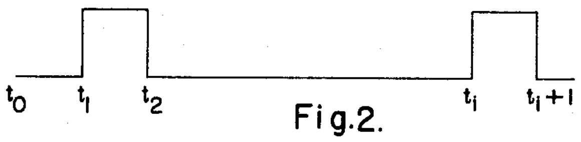
FIG. 2 illustrates a waveform of an astable multivibrator having unequal on and off periods.

FIG. 2 illustrates a typical waveform provided by an astable multivibrator having unequal on and off periods. At time $t_0$, the multivibrator is in its off state of operation until such point as $t_1$ when it switches to an on state of operation for a predetermined period until time $t_2$ is reached whereupon the output signal provided by the multivibrator reverts to its off state of operation for a period of time from $t_2$ to $t_i$ whereupon the multivibrator again switches to its on state of operation for a predetermined period of time until $t_{i+1}$. During the off state of operation, $t_2$ to $t_i$ the astable multivibrator may be supplied with an input signal to cause a transition to an on state of operation for its predetermined on period. Such an operation is more fully described with respect to FIG. 3.

Figure 3:
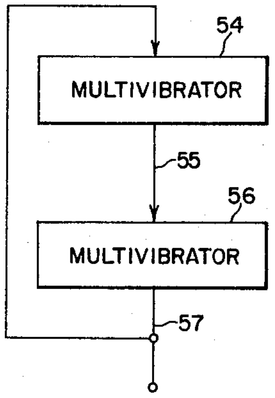
FIG. 3 is a schematic diagram in block form, of two switching devices, to aid in the understanding of the present invention.
Figure 4:
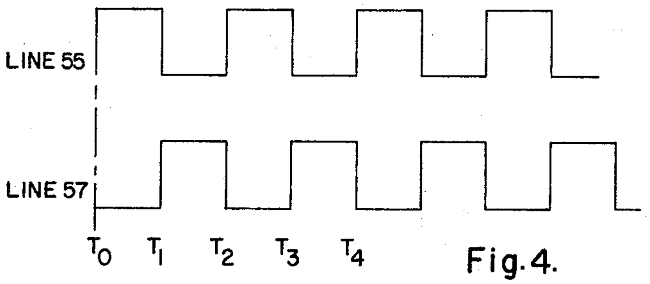
FIG. 4 illustrates typical waveforms obtained from the circuit of FIG. 3.

In FIG. 3, there is shown a first multivibrator 54 which provides an output signal to the input of a second multivibrator 56, the output of which is fed back to the input of multivibrator 54. With specific reference to FIG. 4, a situation will be considered wherein multivibrator 54 produces an output signal on line 55 which is indicative of an on state of operation from time $T_0$ to $T_1$. Multivibrator 56 during this period of time is providing an output signal indicative of an off state of operation. At the time $T_1$, multivibrator 54 switches to its off state of operation, which change causes multivibrator 56 to assume its on state of operation for a predetermined period of time from $T_1$ to $T_2$ after which multivibrator 56 switches back to its off state of operation, which change is fed back to multivibrator 54 to cause it to assume its on state of operation for a period of time from $T_2$ to $T_3$. It may, therefore, be seen that the multivibrators 54 and 56 are connected in a loop circuit and the output waveforms on lines 55 and 57 as shown in FIG. 4 demonstrate that multivibrator 54 is in an on state of operation when multivibrator 56 is in an off state of operation, and conversely, multivibrator 56 is in an on state of operation when multivibrator 54 is in an off state operation, due to the fact that each multivibrator actuates the switching of the other multivibrator, with the switching signal being caused by a transition from one state of operation to an opposite state of operation. The multivibrators may be constructed, as is well known to one skilled in the art, to be responsive that is change states of operation, to a leading edge or alternatively, to a trailing edge of an input signal.

Astable multivibrators are generally self-starting and free running. If appropriate starting provisions are provided, the multivibrators 54 and 56 of FIG. 3 may take the form of monostable or one-shot multivibrators each having a predetermined unstable on period of operation and each being triggered by a leading or trailing edge of an input pulse. Utilizing the principles demonstrated with respect to the multivibrators in FIG. 3, reference should now be made back to FIG. 1 for a fuller understanding of the embodiment of the present invention shown.

With no failures in the clock pulse source, the signals appearing on lines 28, 38 and 48 are identical and may be used as inputs to other decision elements (not shown) or with various other portions of a redundant system. In operation, consider a situation wherein the switching devices utilized are trailing edge astable multivibrators and the first set of switching devices 21, 31 and 41 are in their on state of operation. The ouput signal thus provided when a switching device is in an on state of operation will hereinafter be termed a ONE signal, and when a switching device is in an off state of operation the signal will hereinafter be termed a ZERO signal. With the switching devices 21, 31 and 41 all providing ONE signals, decision elements 23, 33 and 43 will provide a resultant signal having the value of ONE. By way of example only, and not by way of limitation, the decision elements utilized in the example will be majority voting elements. When the switching devices 21, 31 and 41 switch to their off state of operation, the decision elements 23, 33 and 43 will then provide ZERO signals to switching devices 25, 35 and 45 causing them to be placed into an on state of operation so as to provide a ONE output signal on lines 26, 36 and 46 respectively. Decision elements 27, 37 and 47 each receive the ONE output signals from the switching devices 25, 35 and 45 to respectively provide a resultant ONE signal on leads 28, 38 and 48 which are fed back to the first plurality of switching devices 21, 31 and 41 respectively. Switching devices 25, 35 and 45 revert to their off state of operation after a predetermined period of time and provide ZERO signals to decision elements 27, 37 and 47 which will produce resultant signals to cause the switching devices 21, 31 and 41 to switch back to their on state of operation such that ONE signals are provided on lines 22, 32 and 42. This general operation is continued such that the signal appearing on each of the lines 28, 38 and 48 is identical to the waveform illustrated in FIG. 4 with respect to line 57, and the signal appearing on each of the lines 24, 34 and 44 is identical to the waveform associated with line 55 of FIG. 4. A two phase clock system may therefore be obtained by sampling the waveforms appearing on lines 24, 34 and 44 and the waveforms appearing on lines 28, 38 and 48. Suppose now that switching device 41 fails such that it remains in an off state of operation and will not provide a ONE output signal in a normal operation. It is thus seen that when switching devices 21, 31 and 41 should switch to their on state of operation, only switching devices 21 and 31 will provide a ONE output signal while the switching device 41 continuously provides a ZERO output signal. Decision elements 23, 33 and 43 each receive two ONES and a ZERO input signal and being a majority voting element, each will provide a resultant ONE signal which will cause the switching devices 25, 35 and 45 to change states of operation. It is thus seen that even though switching device 41 has failed, switching devices 25, 35 and 45 will continue to provide correct output signals such that the decision elements 27, 37 and 47 provide synchronous waveforms on lines 28, 38 and 48. With the switching device 41 in a failed condition and the lines 28, 38 and 48 providing a correct synchronous clock signal, consider the situation wherein an additional switching device for example the switching device 35 of the second plurality fails and reverts to its off state of operation whereby it is unaffected by input pulses to change states of operation. With switching device 41 in a failed condition, decision elements 23, 33 and 43 each produce signals identical to the signals provided by the majority of switching devices remaining, that is, switching devices 21 and 31. Since the resultant signals on lines 24, 34 and 44 are all identical and correct, switching devices 25 and 45 will continue to change states of operation as was previously described, but switching device 35 will remain in its off state of operation. All of the decision elements 27, 37 and 47 will still provide correct resultant signals on lines 28, 38 and 48 identical with the output signals provided by the majority of switching devices in the second plurality, the majority being switching devices 25 and 45. It may therefore be seen that the waveforms appearing on lines 28, 38 and 48 remain identical and correct as long as a predetermined number of switching devices in each plurality remain in an unfailed condition. Majority voting elements and other decision elements are inherently highly reliable, however, if a decision element should fail, the waveforms appearing on lines 28, 38 and 48 may not be identical; however, redundant circuitry (not shown) responsive to the signals on these latter lines will still provide a correct resultant clock pulse in accordance with a predetermined number of correct signals on these lines, as was explained with reference to a typical decision element of FIG. 1. Although FIG. 1 illustrates three signal channels 20, 30 and 40 with each channel having a like number of switching devices and decision elements as the other channels, it is to be understood that many modifications may be made in the light of the above teachings. For example, the output signals from a first plurality of switching devices may be fed to a first plurality of decision elements having a greater or lesser number of decision elements than preceding switching devices. More broadly, if the first plurality of switching devices 21, 31 and 41 are considered as a first stage; the first plurality of decision elements 23, 33 and 43 considered as a second stage; the second plurality of switching devices 25, 35 and 45 considered as a third stage; etc. it is to be understood that the number of elements in each stage need not be equal. It is apparent that each decision element in a stage need not be responsive to all the output signals of a preceding stage of switching devices, but only a predetermined portion thereof. Although only four stages are shown in FIG. 1, more could be added to obtain a multiphase clock system with a last stage operative to trigger a previous stage such as stage 1.

Accordingly, there has been provided a synchronous redundant pulse source which may be utilized as a clock and which will provide a correct synchronous output signal without dependence on any single circuit component.

Although the present invention has been described with a certain degree of particularity, it should be understood that the present disclosure has been made by way of example and that modification and variations of the present invention are made obvious to one skilled in the art.

What is claimed is:

1. A clock pulse source comprising:
a plurality of signal channels each including a plurality of switching devices and decision elements arranged in alternate serial fashion;
each said decision element arranged to receive output signals from a predetermined number of next preceding switching devices for providing a resultant signal in accordance with said output signals;
each said switching device responsive to a corresponding one of said resultant signals for providing an output signal.

2. A clock source for providing redundant clock signals, comprising:
a plurality of signal channels each including a plurality of switching devices and decision elements arranged in alternate serial fashion;
each said decision element arranged to receive output signals from next preceding switching devices in each said channel for providing a resultant signal in accordance with said output signals;
each said switching device responsive to a corresponding one of said resultant signals for providing an output signal, with a first of said switching devices being responsive to a resultant signal provided by a last of said decision elements.

3. A clock pulse source for providing redundant clock signals, comprising:
a first plurality of switching devices for providing output signals indicative of two states of operation;
a first and like plurality of decision elements for receiving output signals produced by said switching devices to respectively provide a first majority signal identical to the majority of said output signals;
a second and like plurality of switching devices each providing output signals indicative of a first and second state of operation with each being responsive to a respective one of said first majority signals to be placed in one of said states of operation;
a second plurality of decision elements for receiving the signals provided by said second plurality of signal devices for providing respective second majority signals;
said first plurality of switching devices being operable to switch states of operation in response to said second majority signals.

4. A redundant clock source comprising:
a plurality of first multivibrators each capable of providing an off and an on output signal of predetermined time duration in response to an input signal;
a first plurality of majority decision elements each responsive to the output signals provided by a predetermined number of said multivibrators for providing a first resultant signal identical with the majority of said output signals received;
a plurality of second multivibrators each responsive to a different one of said resultant signals for providing output signals;
a second plurality of majority decision elements each responsive to the output signals provided by a predetermined number of said second multivibrators for providing a second resultant signal identical to the majority of signals received;
each of said first multivibrators being responsive to a predetermined resultant signal for providing said on output signal.

5. A redundant clock source comprising:
an odd number of first multivibrators each capable of providing an off and an on output signal of predetermined time duration in response to an input signal;
a like number of first majority decision elements each responsive to the output signals provided by all said multivibrators for providing a first resultant signal identical with the majority of said output signals;
at least a like number of second multivibrators each responsive to a different one of said resultant signals for providing output signals;
at least a like number of second majority decision elements each responsive to the output signals provided by all said second multivibrators for providing a second resultant signal identical to the majority of signals received;
each of said first multivibrators being responsive to a predeterminde resultant signal for providing said on output signal.

References Cited by the Examiner

UNITED STATES PATENTS

| | | | |
|---|---|---|---|
| 2,835,804 | 5/1958 | Luther | 328—192 |
| 2,910,584 | 10/1959 | Steele | 307—88.5 |

ARTHUR GAUSS, *Primary Examiner.*

R. H. EPSTEIN, *Assistant Examiner.*